United States Patent
Oveyssi

(10) Patent No.: US 6,421,208 B1
(45) Date of Patent: Jul. 16, 2002

(54) DISK DRIVE EMPLOYING A VOICE COIL MOTOR COMPRISING A YOKE FOR GENERATING A UNIDIRECTIONAL MAGNETIC FLUX AND A VOICE COIL PARTIALLY INTERACTING WITH THE UNIDIRECTIONAL MAGNETIC FLUX

(75) Inventor: Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 6 days.

(21) Appl. No.: 09/584,652

(22) Filed: May 30, 2000

(51) Int. Cl.[7] .......................... G11B 21/02; H02K 35/00
(52) U.S. Cl. ...................................... 360/264.8; 310/15
(58) Field of Search ........................... 360/264.8, 264.9, 360/265, 266.7, 266.8, 266.9; 310/12, 13, 14, 90.5, 15, 27

(56) References Cited

U.S. PATENT DOCUMENTS

| | | | |
|---|---|---|---|
| 4,658,313 A | * | 4/1987 | Takahashi et al. ............ 360/98 |
| 5,523,911 A | * | 6/1996 | Mita et al. ................... 360/106 |
| 5,557,152 A | * | 9/1996 | Gauthier ...................... 310/46 |
| 5,808,838 A | | 9/1998 | Battu et al. |
| 5,818,667 A | | 10/1998 | Larson |
| 5,822,156 A | | 10/1998 | Suzuki et al. |
| 5,914,836 A | | 6/1999 | Pottebaum |
| 5,953,183 A | | 9/1999 | Butler et al. |
| 6,157,099 A | * | 12/2000 | Hartman ....................... 310/13 |

* cited by examiner

Primary Examiner—William Klimowicz
(74) Attorney, Agent, or Firm—Milad G Shara, Esq.; Won Tae C. Kim, Esq.

(57) ABSTRACT

A disk drive is disclosed including a disk, an actuator arm including a head, and a voice coil motor for actuating the actuator arm to position the head radially over the disk. The voice coil motor includes a voice coil portion including a first side and a second side opposite the first side for conducting a current. The current conducted by the first side generates a first side magnetic flux in a first direction, and the current conducted by the second side generates a second side magnetic flux in a second direction different from the first direction. The voice coil motor further includes a rotary voice coil yoke including a first magnet for generating a unidirectional magnetic flux, and a magnetic flux conductor shaped to form an air gap with respect to the first magnet, the magnetic flux conductor for guiding the unidirectional magnetic flux through the air gap. The first side of the voice coil portion is located substantially within the air gap such that the first side magnetic flux substantially interacts with the unidirectional magnetic flux, and the second side of the voice coil portion is located substantially outside the air gap such that the second side magnetic flux does not substantially interact with any magnetic flux.

16 Claims, 7 Drawing Sheets

DISK DRIVE EMPLOYING A VOICE COIL MOTOR COMPRISING A YOKE FOR GENERATING A UNIDIRECTIONAL MAGNETIC FLUX AND A VOICE COIL PARTIALLY INTERACTING WITH THE UNIDIRECTIONAL MAGNETIC FLUX

BACKGROUND OF THE INVENTION

1. Field of the Invention

The present invention relates to disk drives for computer systems. More particularly, the present invention relates to a disk drive employing a voice coil motor comprising a yoke for generating a unidirectional magnetic flux and a voice coil partially interacting with the unidirectional magnetic flux.

2. Description of the Prior Art

Referring to FIG. 1, a conventional disk drive typically comprises a disk for storing data in a plurality of radially spaced, concentric tracks 4. A head 6 is actuated radially over the disk 2 in order to write data to or read data from a target track 4. The head 6 is typically attached to a suspension 8 which biases the head 6 toward the surface of the disk 2. The suspension 8 is attached to the distal end of an actuator arm 10 which is rotated about a pivot 12 by a voice coil motor 14. The disk 2 typically has recorded thereon embedded servo wedges 16 which store coarse and fine head position information for positioning the head 6 over a centerline of a target track 4.

As shown in FIG. 2, a conventional voice coil motor 14 typically comprises a voice coil 18 in the shape of a trapezoid comprising a first side 20A opposite a second side 20B. A current is passed through the voice coil 18 to induce a first magnetic flux 22A and a second magnetic flux 22B along the length of each side (20A and 20B). Because the voice coil 18 is wound up one leg and down the other, the direction of the magnetic flux 22A induced along the first side 20A is opposite the direction of the magnetic flux 22B induced along the second side 20B. A first magnet 24A and a second magnet 24B induce respective magnetic fluxes into and out of the page which are orthogonal to the magnetic fluxes (22A and 22B) induced by the voice coil 18. The orthogonal magnetic fluxes induce a horizontal force on the voice coil 18, thereby rotating the actuator arm 10 about the pivot 12 to move the head 6 radially over the disk 2. The actuator arm's direction of rotation (clockwise or counter-clockwise) depends on the direction of the current passing through the voice coil 18 (clockwise or counter-clockwise). Thus, the direction of the head 6 is reversed by reversing the direction of the current passing through the voice coil 18.

Because the direction of the magnetic flux 22A induced along the first side 20A of the voice coil 18 is opposite the direction of the magnetic flux 22B induced along the second side 20B, the first magnet 24A is magnetized from top to bottom with a magnetic polarity (N/S or S/N) that is opposite that of the second magnet 24B so that the magnetic fluxes 24A and 24B are 12 aligned in the appropriate direction. In one embodiment, the first and second magnets (24A and B 24B) are manufactured from separate pieces of magnetic material and then magnetized with the appropriate polarity N/S or S/N. In alternative embodiment, the first and second magnets (24A and 24B) are manufactured from a single piece of magnetic material and then magnetized with the appropriate polarity (N/S and S/N). Thus, the dashed line between the first and second magnets (24A and 24B) shown in FIG. 2 may represent a border between two separate pieces of magnet material, or a polarity border delineating two separate magnetized regions of a single piece of magnetic material.

The first and second magnets (24A and 24B) are housed within a rotary voice coil yoke 26, further details for which are illustrated in a perspective view in FIG. 3A and in a plane view in FIG. 3B. The yoke 26 comprises a top magnetic flux conductor 28A and a bottom magnetic flux conductor 28B. The first and second magnets (24A and 24B) are attached to an interior surface 30 of the top magnetic flux conductor 28A. The yoke 26 may further comprise a third magnet 32A and a forth magnet 32B attached to an interior surface 31 of the bottom magnetic flux conductor 28B. As shown in FIG. 3B, the top magnetic flux conductor 28A and the bottom magnetic flux conductor 28B form an air gap 34 between the magnets (24A, 24B, 32A and 32B). The polarity (N/S) of the magnets (24A, 24B, 32A and 32B) generates a multidirectional magnetic flux 36A and 36B with respect to the air gap 34. In the example shown in FIG. 3B, the direction of magnetic flux 36A is upward from magnet 32A to magnet 24A, and the direction of magnetic flux 36B is downward from magnet 24B to magnet 32B. The magnetic flux 36A interacts with the magnetic flux 22A of FIG. 2 generated by the first side 20A of the voice coil 18, and the magnetic flux 36B interacts with the magnetic flux 22B generated by the second side 20B of the voice coil 18.

There are drawbacks associated with the conventional rotary voice coil yoke design of FIG. 3A and 3B. Namely, the magnets 24A, 24B, 32A and 32B represent a significant cost of the overall actuator assembly. In particular, the magnetic material itself is expensive and there is 14 expense involved with magnetizing the magnetic material. In addition, the conventional yoke design increases the manufacturing cost of the disk drive due to the three step process required to manufacture the actuator assembly which is illustrated in FIG. 4. First, the bottom magnetic flux conductor 28B is fastened to the base of the disk drive (e.g., glued or screwed down). Next, the actuator arm 10 is fastened onto the pivot 12 such that the voice coil 18 is positioned over the second and third magnet 32A and 32B. Finally, the top magnetic flux conductor 28A is fastened to the bottom magnetic flux conductor 28B (e.g., glued or screwed down) such that the first and second magnets 24A and 24B are positioned over the voice coil 18. This three step process increases the manufacturing time and therefore the manufacturing cost of the disk drive.

There is, therefore, the need to reduce the manufacturing cost of a disk drive, particularly with respect to the voice coil motor. Specifically, there is a need to reduce the cost of the magnets employed in the voice coil motor, as well as reduce the cost associated with assembling the voice coil motor and actuator arm.

SUMMARY OF THE INVENTION

The present invention may be regarded as a disk drive comprising a disk, an actuator arm comprising a head, and a voice coil motor for actuating the actuator arm to position the head radially over the disk. The voice coil motor comprises a voice coil portion comprising a first side and a second side opposite the first side for conducting a current. The current conducted by the first side generates a first side magnetic flux in a first direction, and the current conducted by the second side generates a second side magnetic flux in a second direction different from the first direction. The voice coil motor further comprises a rotary voice coil yoke comprising a first magnet for generating a unidirectional magnetic flux, and a magnetic flux conductor shaped to form an air gap with respect to the first magnet, the magnetic flux conductor for guiding the unidirectional magnetic flux through the air gap. The first side of the voice coil portion is located substantially within the air gap such that the first side magnetic flux substantially interacts with the unidirectional magnetic flux, and the second side of the voice coil portion is located substantially outside the air gap such that the second side magnetic flux does not substantially interact with any magnetic flux.

The present invention may also be regarded as a rotary voice coil yoke for use in a voice coil motor, the voice coil motor for actuating a head attached to an actuator arm over a disk in a disk drive. The rotary voice coil motor comprises a voice coil portion comprising a first side and a second side opposite the first side for conducting a current wherein the current conducted by the first side generates a first side magnetic flux in a first direction and the current conducted by the second side generates a second side magnetic flux in a second direction different from the first direction. The rotary voice coil yoke comprises a first magnet for generating a unidirectional magnetic flux, and a magnetic flux conductor shaped to form an air gap with respect to the first magnet, the magnetic flux conductor for guiding the unidirectional magnetic flux through the air gap. The first side of the voice coil portion is located substantially within the air gap such that the first side magnetic flux substantially interacts with the unidirectional magnetic flux, and the second side of the voice coil portion is located substantially outside the air gap such that the second side magnetic flux does not substantially interact with any magnetic flux.

DESCRIPTION OF THE PREFERRED EMBODIMENTS

Figure 5:
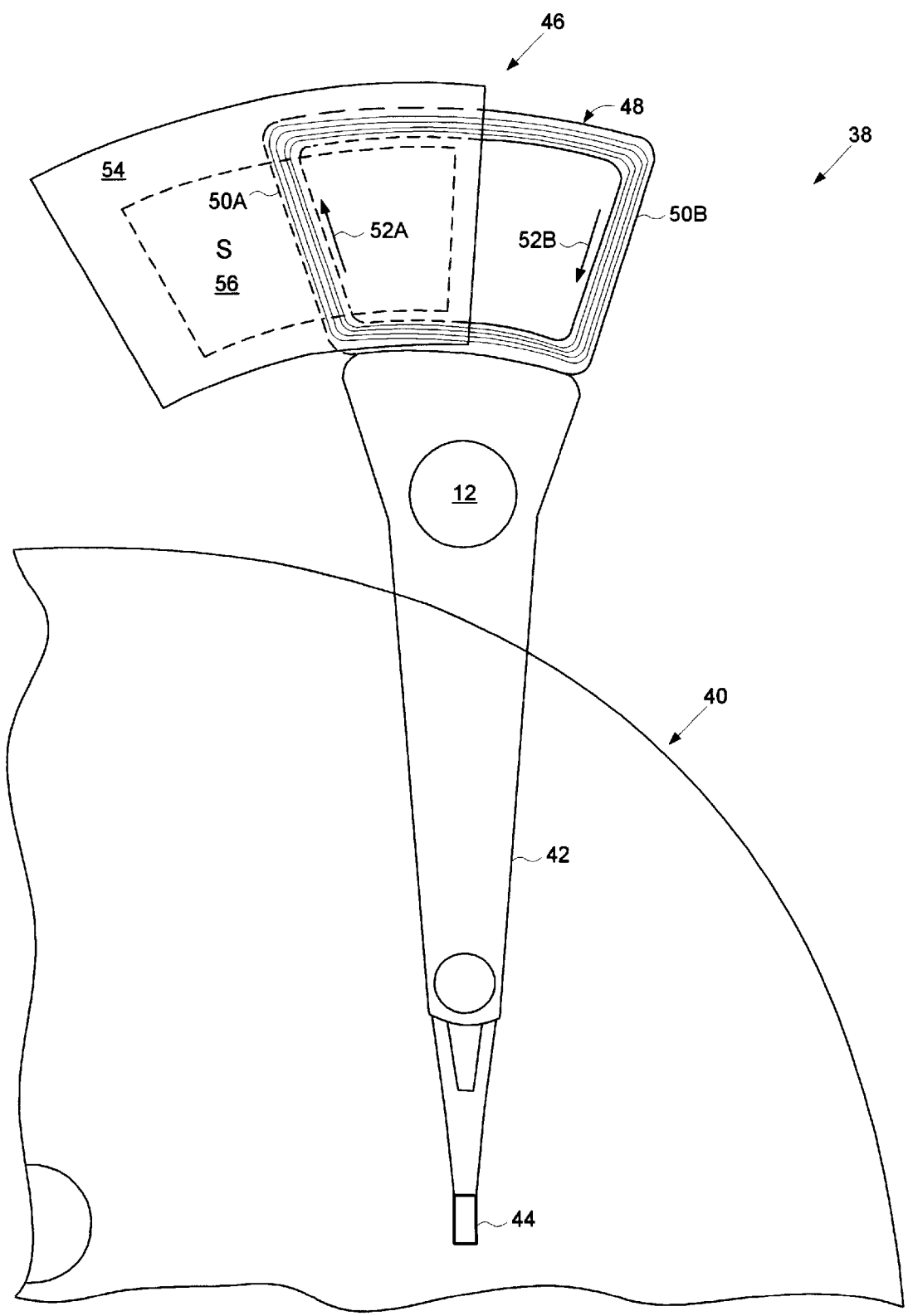
FIG. 5 shows a voice coil motor according to an embodiment of the present invention comprising a rotary voice coil yoke for generating a unidirectional magnetic flux, wherein a voice coil interacts only partially with the unidirectional magnetic flux.

FIG. 5 shows a disk drive 38 according to an embodiment of the present invention as comprising a disk 40, an actuator arm 42 comprising a head 44, and a voice coil motor 46 for actuating the actuator arm 42 to position the head 44 radially over the disk 40. The voice coil motor 46 comprises a voice coil portion 48 comprising a first side 50A and a second side 50B opposite the first side 50A for conducting a current. The current conducted by the first side 50A generates a first side magnetic flux 52A in a first direction, and the current conducted by the second side 50B generates a second side magnetic flux 52B in a second direction different from the first direction. The voice coil motor 46 further comprises a rotary voice coil yoke 54 comprising a first magnet 56 for generating a unidirectional magnetic flux 58 (FIG. 6B), and a magnetic flux conductor 60 shaped to form an air gap 62 with respect to the first magnet 56, the magnetic flux conductor 60 for guiding the unidirectional magnetic flux 58 through the air gap 62. The first side 50A of the voice coil portion 48 is located substantially within the air gap 62 such that the first side magnetic flux 52A substantially interacts with the unidirectional magnetic flux 58, and the second side 50B of the voice coil portion 48 is located substantially outside the air gap 62 such that the second side magnetic flux 52B does not substantially interact with any magnetic flux.

Figure 4:
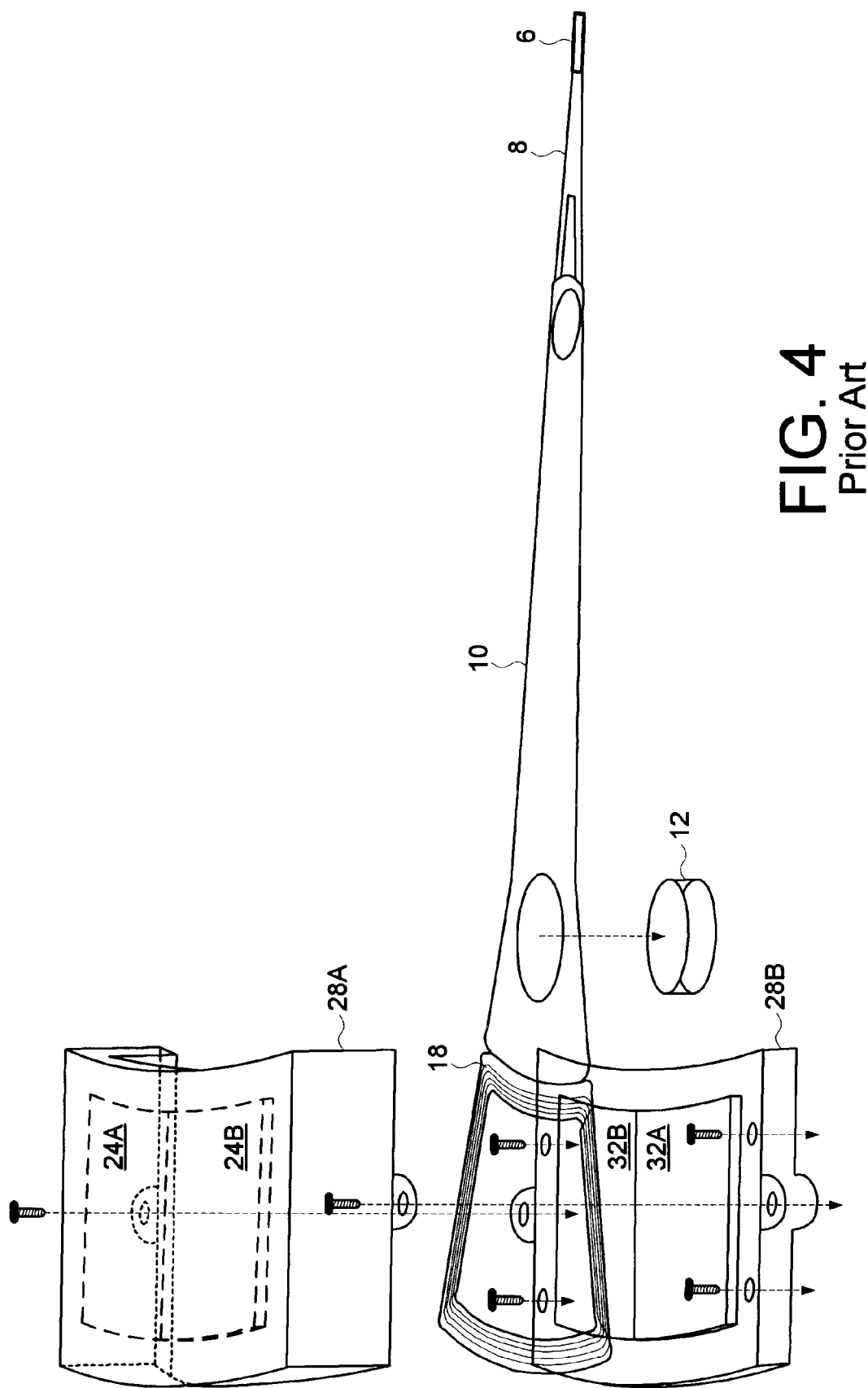
FIG. 4 illustrates the three step process involved with assembling the conventional voice coil motor of FIG. 2.

The voice coil motor 46 in the embodiment of FIG. 5 significantly reduces the overall cost of the disk drive 38. In particular, it requires approximately half as much magnetic material a to manufacture the magnet 56 of FIG. 5 as compared to the magnets 24A and 24B in the conventional voice coil motor of FIG. 2. Further, it is not necessary to magnetize the magnet 56 of FIG. 5 with a polarity border as with the magnets 24A and 24B of FIG. 2. Still further, assembling the voice coil motor 46 and actuator arm 42 is simplified as compared to the more complicated three step process required to assemble the prior art disk drives as illustrated in FIG. 4. The simplified assembly process according to an embodiment of the present invention is described in greater detail below with reference to FIGS. 7A and 7B.

Figure 1:
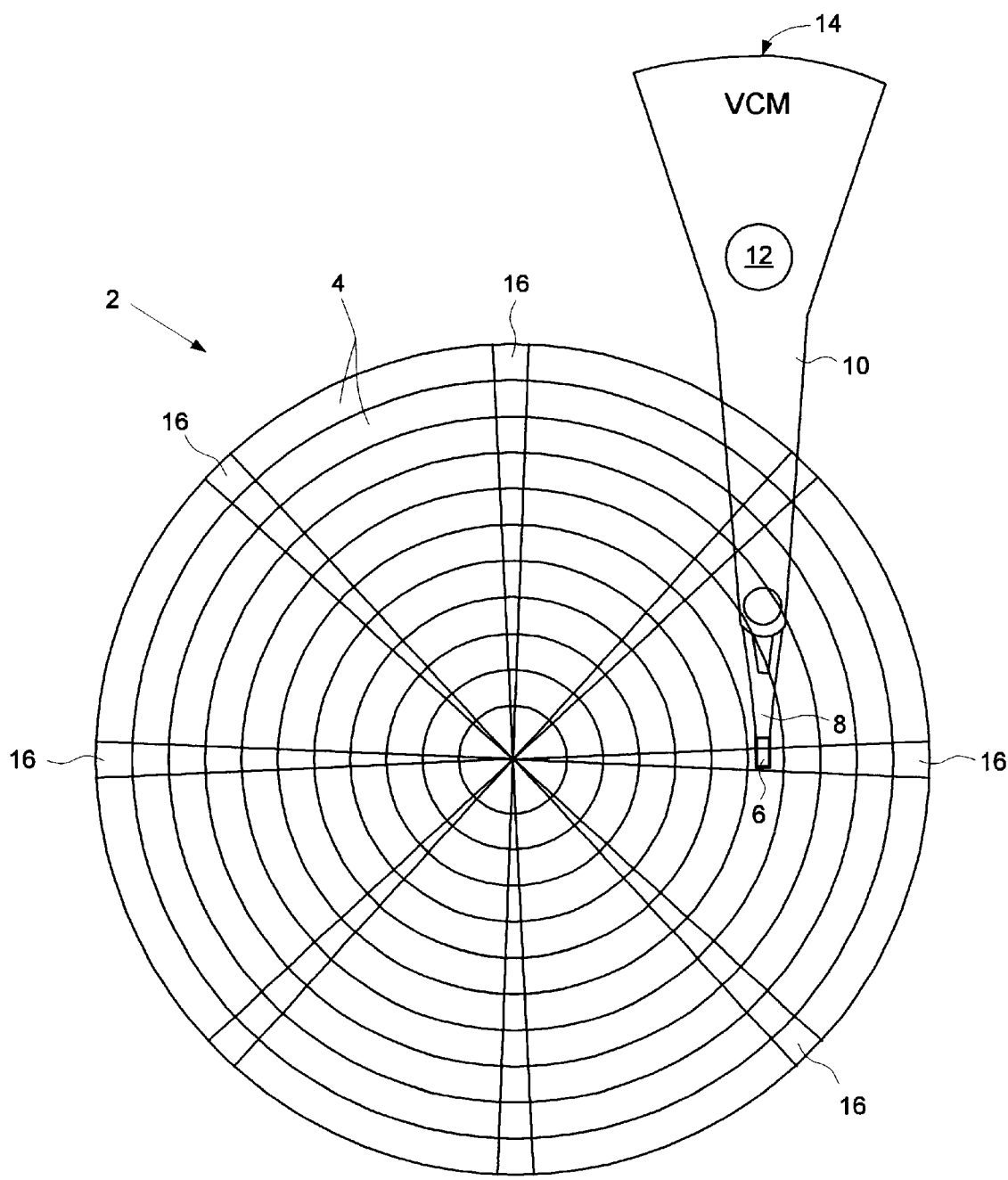
FIG. 1 shows a prior art disk drive comprising a disk, an actuator arm comprising a head attached to a distal end, and a voice coil motor for actuating the actuator arm to position the head radially over the disk.
Figure 2:
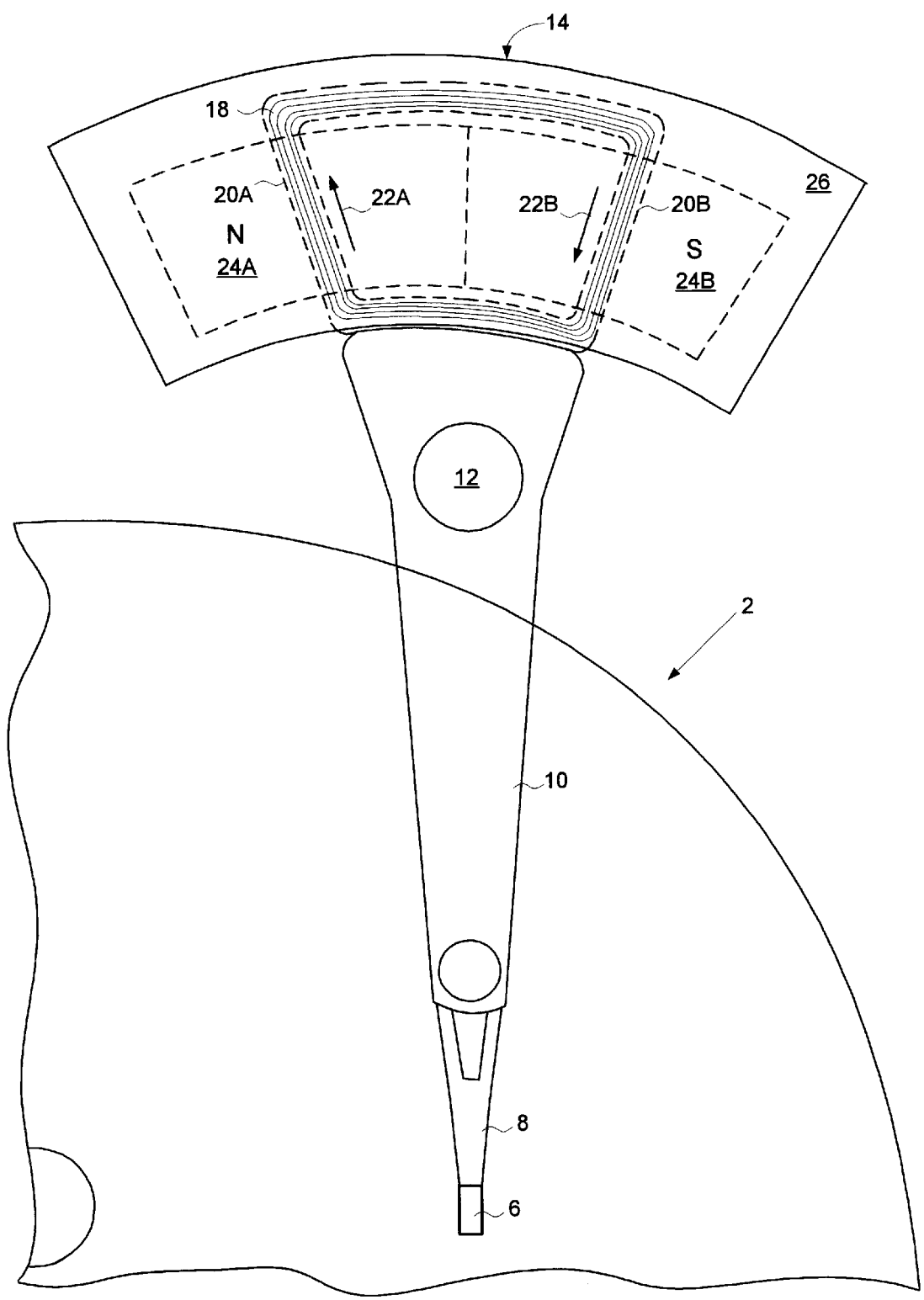
FIG. 2 shows a prior art voice coil motor comprising a trapezoidal voice coil interacting with magnets inside a rotary voice coil yoke.
Figure 3A:
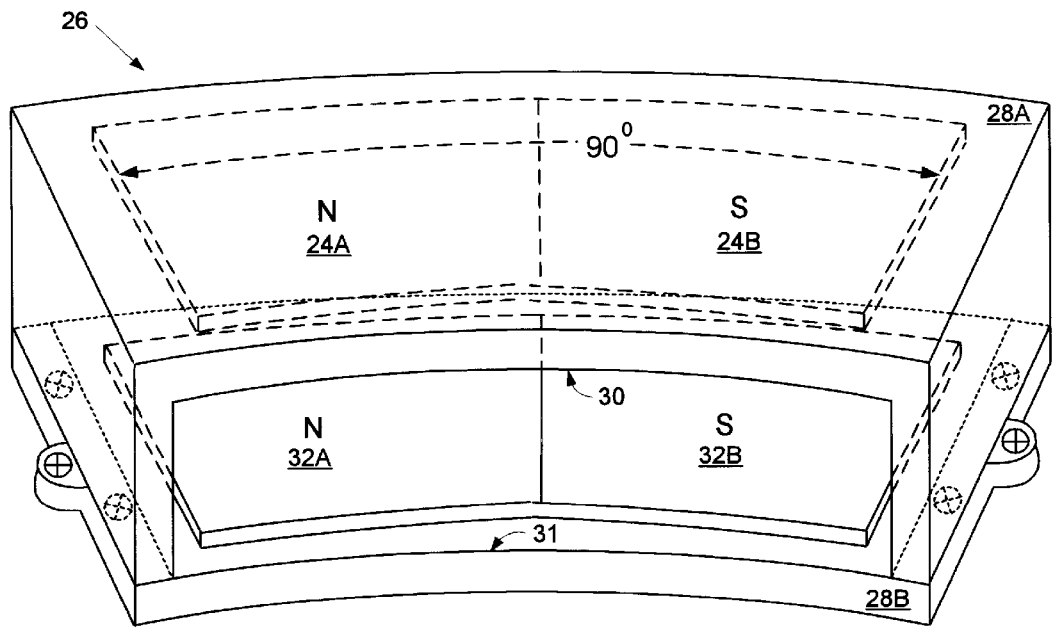
FIGS. 3A and 3B show further details of the conventional rotary voice coil yoke of FIG. 2, including the top and bottom magnets for generating a multidirectional magnetic flux which interacts with both sides of the trapezoidal voice coil in order to rotate the actuator arm about a pivot.
Figure 3B:
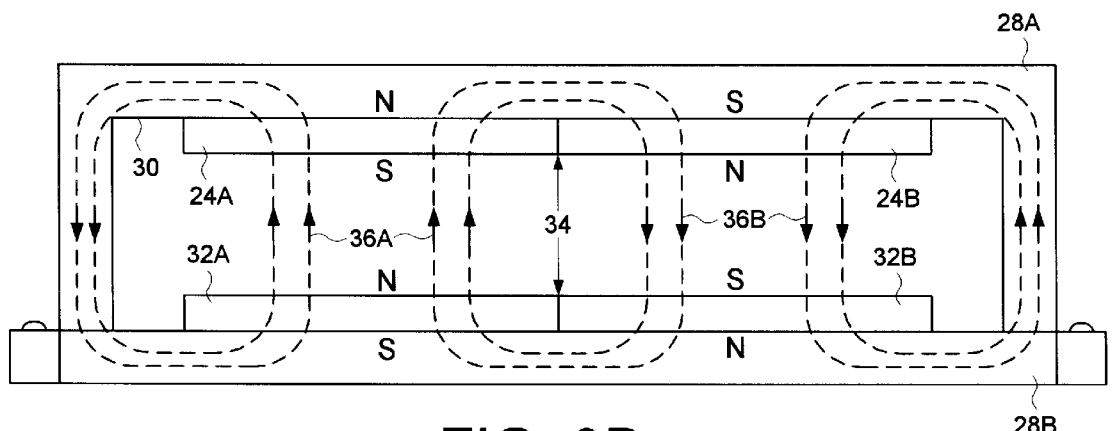

The voice coil motor 46 in the embodiment of FIG. 5 essentially implements half of the conventional voice coil motor 14 of FIG. 2. The magnet 56 of FIG. 5 corresponds to the magnet 24A of FIG. 2, and the rotary voice coil yoke 54 of FIG. 5 corresponds to essentially half of the rotary voice coil yoke 26 of FIG. 2. Further, only the first side 50A of the voice coil 48 interacts with the unidirectional magnetic flux 58 generated within the rotary voice coil yoke 54 of FIG. 5. Consequently, the voice coil motor 46 of FIG. 5 generates only half the torque as that generated by the conventional voice coil motor 14 of FIG. 3. Advantageously, however, the access time (the time required to access a given track) is not linearly dependent on the torque generated by the voice coil motor. Instead, the access time scales closer to the square root of the torque. Thus, even though the voice coil motor 46 of FIG. 5 generates 50% less torque, the access time unexpectedly increases only by about 30%.

Figure 6A:
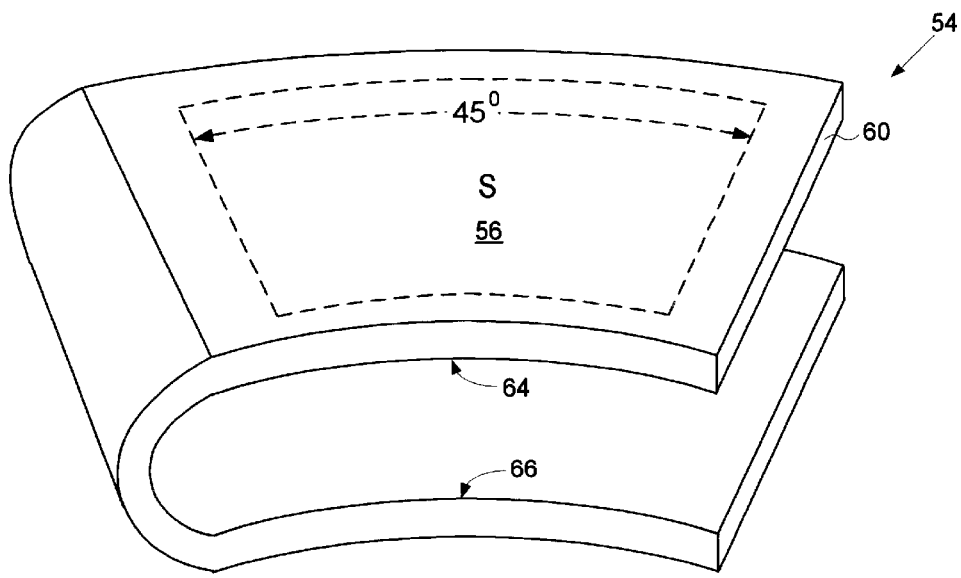
FIG. 6A shows further details of the rotary voice coil yoke of FIG. 5 as comprising a single piece of metal and a first magnet, wherein the metal is shaped to form an air gap with respect to the first magnet.

FIG. 6A shows an embodiment in perspective view of the rotary voice coil yoke 54 of FIG. 5 wherein the magnetic flux conductor 60 comprises a single piece of metal formed into a U shape. As shown in the plane view of FIG. 6B, the U-shaped metal provides a return path for the magnetic flux 58 from the bottom to the top of the magnetic flux conductor 60. The magnetic flux conductor 60 should be of sufficient thickness relative to the strength of the magnetic flux 58 so that the magnetic flux 58 does not saturate the magnetic conductor 60. Further, the magnetic flux conductor 60 as well as the magnet 56 should be wide enough to allow the actuator arm 40 to rotate a sufficient number of degrees (e.g., 45°) to allow the head 44 to reach the landing zone of the inner diameter track as well as the outer diameter track on the disk 40.

The voice coil 48 should be wide enough such that when the first side 50A of the voice coil 48 reaches the extreme left side of the magnet 56, the second side 50B is still substantially is outside of the air gap 62 so that the second side magnetic flux 52B does not substantially interact with the unidirectional magnetic flux 58. This is necessary since the direction of the second side magnetic flux 52B is opposite the first side magnetic flux 52A. If allowed to interact with the unidirectional magnetic flux 58, the second side magnetic flux 52B would generate a torque in a direction opposite the torque generated by the first side magnetic flux 52A, which is undesirable. In one embodiment, the voice coil 48 is of sufficient width such that the second side 50B does not come closer than 2 mm from the edge of the magnetic flux conductor 60. This ensures that that the second side magnetic flux 52B does not substantially interact with the unidirectional magnetic flux 58.

It is also desirable to prevent the top and bottom segments of the voice coil 48 from interacting with the unidirectional magnetic flux 58. In the embodiment of FIG. 5, the voice coil 48 and magnet 56 comprise a substantially trapezoidal shape which ensures that the first side 50A of the voice coil 48 is fully exposed to the unidirectional magnetic flux 58 while keeping the top and bottom segments of the voice coil 48 outside of the unidirectional magnetic flux 58 throughout the rotational pitch.

Figure 6B:
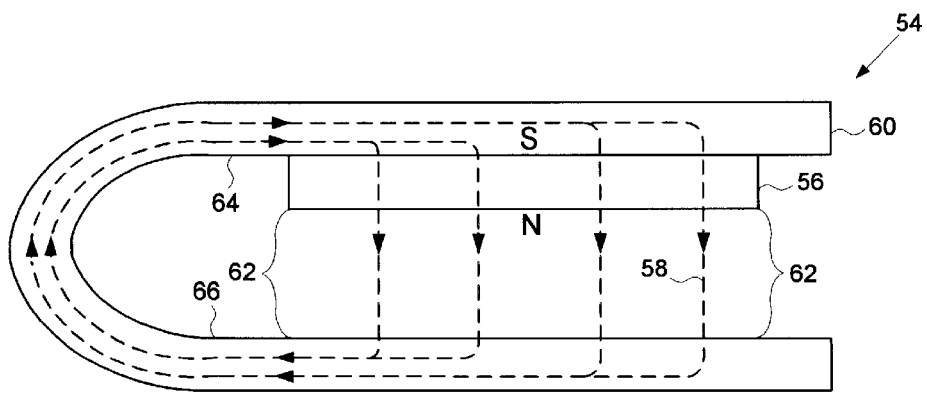
FIG. 6B shows the unidirectional magnetic flux generated by the rotary voice coil yoke of FIG. 6A.

In the embodiment shown in FIG. 6B, the U-shaped magnetic flux conductor 60 comprises an inner top surface 64 and an inner bottom surface 66, and the magnet 56 for generating the unidirectional magnetic flux 58 is attached to the inner top surface 64. In an alternative embodiment, the magnet 56 may be attached to the inner bottom surface 66 such that the return path of the magnetic flux is from the bottom to the top of the magnetic flux conductor 60. In yet another embodiment, the polarity of the magnet 56 is reversed such that the unidirectional magnetic flux 58 travels in a counterclockwise direction as opposed to the clockwise direction shown in FIG. 6B.

Figure 6C:
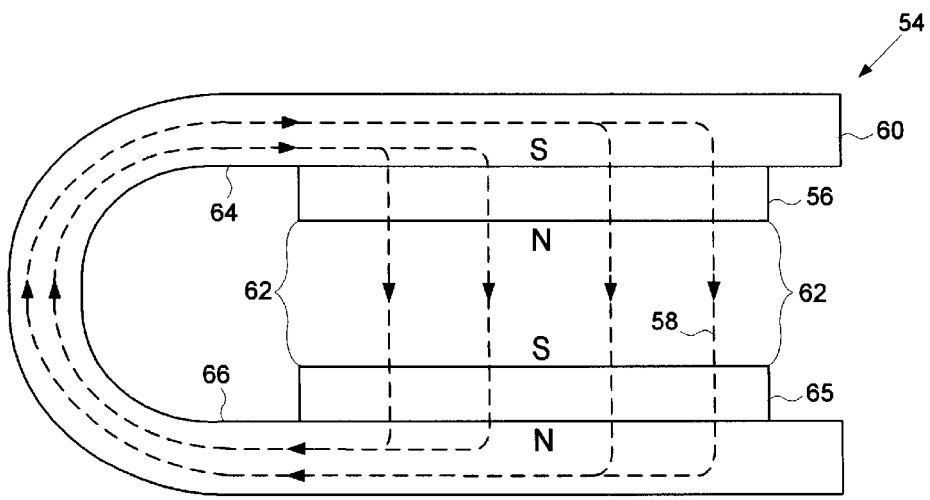
FIG. 6C shows an alternative embodiment of the present invention wherein the rotary voice coil yoke further comprises a second magnet attached to the yoke opposite the first magnet in order to amplify, stabilize and linearize the unidirectional magnetic flux.

In an alternative embodiment of the present invention shown in the plane view of FIG. 6C, the rotary voice coil yoke 54 further comprises a second magnet 65 attached to the inner bottom surface 66 of the magnetic flux conductor 60. The second magnet 65 amplifies, stabilizes and linearizes the unidirectional magnetic flux 58 throughout the length of the air gap 62. The thickness of the magnetic flux conductor 60 in this embodiment is increased to accommodate the increased unidirectional magnetic flux 58 due to the second magnet 65.

In the embodiments shown in FIG. 6B and 6C, the air gap 62 in the rotary voice coil yoke 54 should not be significantly wider than the thickness of the voice coil 48 in order to optimize the resulting torque generated by the unidirectional magnetic flux 58. In this respect, design specifications similar to a conventional voice coil motor 14, such as that shown in FIG. 2, will suffice.

Figure 7A:
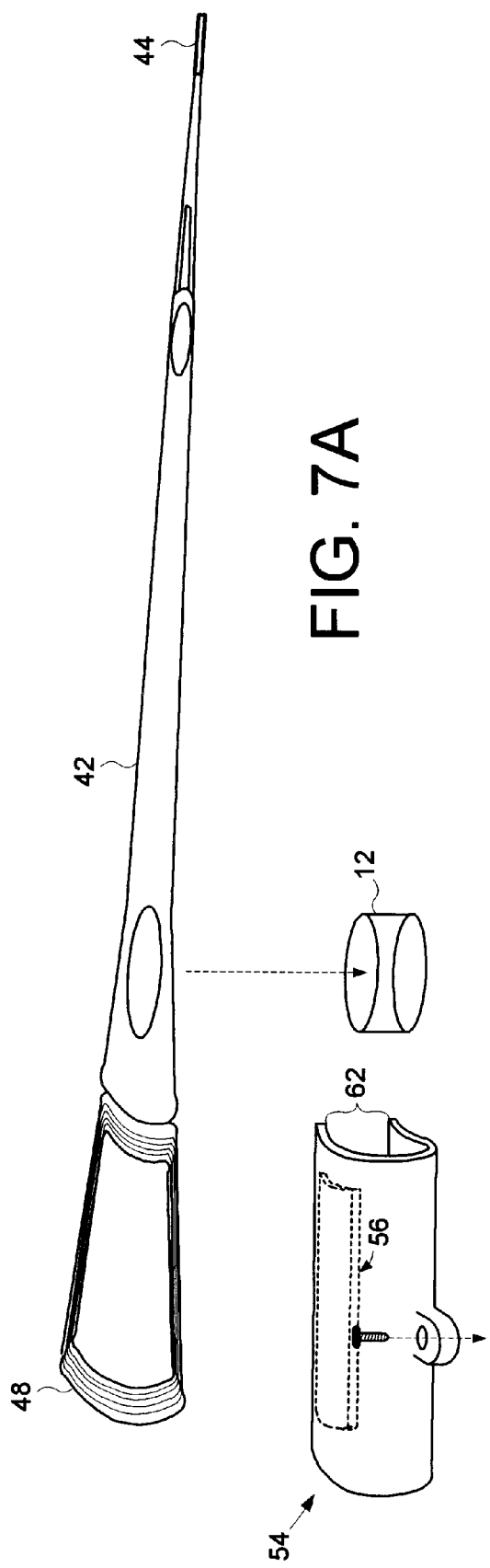
FIGS. 7A and 7B illustrate a simplified process for assembling a voice coil motor and actuator arm according to an embodiment of the present invention.
Figure 7B:
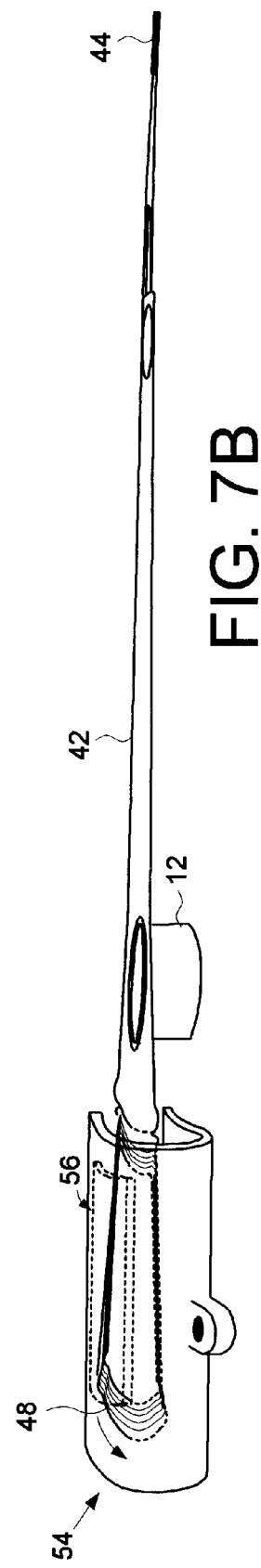

FIGS. 7A and 7B illustrate a procedure for assembling the voice coil motor 46 and actuator arm 42 of FIG. 5 which requires less manufacturing time than the prior art procedure illustrated in FIG. 4, thereby reducing the overall cost of the disk drive. The rotary voice coil yoke 54 is first attached to the base of the disk drive (e.g., glued or screwed down). The actuator arm 42 is then oriented such that the voice coil 48 is clear of the rotary voice coil yoke 54 so that the actuator arm can be attached to the pivot 12 as illustrated in FIG. 7A. The actuator arm 42 is then rotated to position the voice coil 48 inside the air gap 62 of the rotary voice coil yoke 54 as illustrated in FIG. 7B. This procedure takes significantly less time as compared to the three step prior art procedure illustrated in FIG. 4.

I claim:
1. A disk drive comprising:
  (a) a disk;
  (b) an actuator arm comprising a head; and
  (c) a voice coil motor for actuating the actuator arm to position the head radially over the disk, the voice coil motor comprising:
    i. a voice coil portion connected to a base end of the actuator arm, the voice coil portion comprising a first side and a second side opposite the first side for conducting a current, wherein
      the current conducted by the first side generates a first side magnetic flux in a first direction; and
      the current conducted by the second side generates a second side magnetic flux in a second direction different from the first direction,
    ii. a rotary voice coil yoke comprising:
      a first magnet for generating a unidirectional magnetic flux, the first magnet being magnetized perpendicular to the plane of motion of the actuator arm; and
      a magnetic flux conductor shaped to form an air gap with respect to the first magnet, the magnetic flux conductor for guiding the unidirectional magnetic flux through the air gap, wherein:
        the first side of the voice coil portion is located substantially within the air gap such that the first side magnetic flux substantially interacts with the unidirectional magnetic flux; and
        the second side of the voice coil portion is located substantially outside the air gap such that the second side magnetic flux does not substantially interact with any magnetic flux.

2. The disk drive as recited in claim 1, wherein the magnetic flux conductor is formed from a single piece of metal.

3. The disk drive as recited in claim 2, wherein the single piece of metal comprises a substantially U shape.

4. The disk drive as recited in claim 2, wherein:
  (a) the single piece of metal comprises a substantially U shape comprising an inner top surface and an inner bottom surface; and
  (b) the first magnet is attached to either the inner top surface or the inner bottom surface.

5. The disk drive as recited in claim 4, wherein:
  (a) the rotary voice coil yoke further comprises a second magnet for amplifying the unidirectional magnetic flux; and
  (b) the second magnet is attached to either the inner top surface or the inner bottom surface opposite the first magnet.

6. The disk drive as recited in claim 1, wherein the voice coil portion comprises a substantially trapezoidal shape and the first and second sides form a first and second side of the trapezoidal shape.

7. The disk drive as recited in claim 6, wherein the first magnet comprises a substantially trapezoidal shape.

8. The disk drive as recited in claim 1, wherein the rotary voice coil yoke further comprises a second magnet for amplifying the unidirectional magnetic flux.

9. A rotary voice coil yoke for use in a voice coil motor, the voice coil motor for actuating a head attached to an actuator arm over a disk in a disk drive, the rotary voice coil motor comprising a voice coil portion connected to a base end of the actuator arm, the voice coil portion comprising a first side and a second side opposite the first side for conducting a current wherein the current conducted by the first side generates a first side magnetic flux in a first direction and the current conducted by the second side generates a second side magnetic flux in a second direction different from the first direction, the rotary voice coil yoke comprising a first magnet for generating a unidirectional magnetic flux, the first magnet being magnetized perpendicular to the plane of motion of the actuator arm; and a magnetic flux conductor shaped to form an air gap with respect to the first magnet, the magnetic flux conductor for guiding the unidirectional magnetic flux through the air gap, wherein:

the first side of the voice coil portion is located substantially within the air gap such that the first side magnetic flux substantially interacts with the unidirectional magnetic flux; and the second side of the voice coil portion is located substantially outside the air gap such that the second side magnetic flux does not substantially interact with any magnetic flux.

10. The rotary voice coil yoke as recited in claim 9, wherein the magnetic flux conductor is formed from a single piece of metal.

11. The rotary voice coil yoke as recited in claim 10, wherein the single piece of metal comprises a substantially U shape.

12. The rotary voice coil yoke as recited in claim 10, wherein:

(a) the single piece of metal comprises a substantially U shape comprising an inner top surface and an inner bottom surface; and (b) the first magnet is attached to either the inner top surface or the inner bottom surface.

13. The rotary voice coil yoke as recited in claim 12, wherein:

(a) the rotary voice coil yoke further comprises a second magnet for amplifying the unidirectional magnetic flux; and (b) the second magnet is attached to either the inner top surface or the inner bottom surface opposite the first magnet.

14. The rotary voice coil yoke as recited in claim 9, wherein the voice coil portion comprises a substantially trapezoidal shape and the first and second sides form a first and second side of the trapezoidal shape.

15. The rotary voice coil yoke as recited in claim 14, wherein the first magnet comprises a substantially trapezoidal shape.

16. The rotary voice coil yoke as recited in claim 9, wherein the rotary voice coil yoke further comprises a second magnet for amplifying the unidirectional magnetic flux.

* * * * *

UNITED STATES PATENT AND TRADEMARK OFFICE
CERTIFICATE OF CORRECTION

PATENT NO. : 6,421,208 B1
DATED : July 16, 2002
INVENTOR(S) : Kamran Oveyssi

It is certified that error appears in the above-identified patent and that said Letters Patent is hereby corrected as shown below:

<u>Title page,</u>
Item [54], title, both occurrences of the word "UNDIRECTIONAL" should read
-- UNIDIRECTIONAL --
The title should read as follows:
-- **DISK DRIVE EMPLOYING A VOICE COIL MOTOR COMPRISING A YOKE FOR GENERATING A UNIDIRECTIONAL MAGNETIC FLUX AND A VOICE COIL PARTIALLY INTERACTING WITH THE UNIDIRECTIONAL MAGNETIC FLUX --

Signed and Sealed this

Twenty-sixth Day of November, 2002

*Attest:*

JAMES E. ROGAN
*Attesting Officer*  *Director of the United States Patent and Trademark Office*